(12) United States Patent
Wang

(10) Patent No.: US 9,094,772 B2
(45) Date of Patent: Jul. 28, 2015

(54) DEVICE, SYSTEM AND METHOD FOR PROCESSING MACHINE TO MACHINE/MAN SERVICE

(75) Inventor: Peng Wang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 337 days.

(21) Appl. No.: 13/574,999

(22) PCT Filed: Feb. 17, 2011

(86) PCT No.: PCT/CN2011/071065
§ 371 (c)(1),
(2), (4) Date: Jul. 24, 2012

(87) PCT Pub. No.: WO2011/134300
PCT Pub. Date: Nov. 3, 2011

(65) Prior Publication Data
US 2013/0035127 A1 Feb. 7, 2013

(30) Foreign Application Priority Data

Apr. 27, 2010 (CN) .......................... 2010 1 0165505

(51) Int. Cl.
H04B 7/00 (2006.01)
H04W 4/00 (2009.01)
G06F 9/50 (2006.01)
G06F 9/54 (2006.01)

(52) U.S. Cl.
CPC ............... H04W 4/00 (2013.01); G06F 9/5027 (2013.01); G06F 9/54 (2013.01); H04W 4/005 (2013.01)

(58) Field of Classification Search
CPC .......... H04W 4/005; H04W 4/00; G06F 9/54; G06F 9/5027
USPC ......................................... 455/41.2, 518, 519
See application file for complete search history.

(56) References Cited

FOREIGN PATENT DOCUMENTS

CN 101237455 A 8/2008
CN 101572886 A 11/2009

OTHER PUBLICATIONS

U.S. Publication No. 2006/0200819 A1, to Cherkasova, et al., published Sep. 7, 2006.

Primary Examiner — Raymond Dean
(74) Attorney, Agent, or Firm — Koppel, Patrick, Heybl & Philpott

(57) ABSTRACT

The disclosure discloses a device, a method and a system for processing Machine to Machine/Man (M2M) service information to simplify processing courses of the M2M service and to improve processing efficiency of the M2M service. The device comprises: a receiving unit (410) configured to receive the M2M downlink service information transmitted to a first virtual terminal, wherein the first virtual terminal has at least one function of at least two machine terminals; a processing unit (420) configured to determine, according to a second corresponding relationship between a machine terminal and a function in the first virtual terminal, the machine terminal corresponding to each function contained in the M2M downlink service information and to split the M2M downlink service information into the service information of individual machine terminals to send to the corresponding machine terminal.

14 Claims, 5 Drawing Sheets

DEVICE, SYSTEM AND METHOD FOR PROCESSING MACHINE TO MACHINE/MAN SERVICE

This is a National Stage Application of PCT/CN2011/071065 filed Feb. 17, 2011, published as WO 2011/134300 A1, and claiming priority from CN201010165505.5 filed Apr. 27, 2010.

FIELD OF THE INVENTION

The disclosure relates to the field of network communication technologies, and in particular to a device, a system and a method for processing a Machine to Machine/Man (M2M) service.

BACKGROUND OF THE INVENTION

M2M, as a means of implementing wireless communication between machine and machine or between machine and man, provides a new solution for the information of the manufacturing industry, for instance, installing in electric equipment a module capable of monitoring the operating parameters of an electric distribution network to realize the real-time monitoring, control and management maintenance of an electric distribution system; installing in petroleum equipment a module capable of collecting the working condition information of an oil well to adjust and control an oil rig remotely and to learn the working condition of the oil rig in time; and assembling in a car a terminal collecting vehicle information and a remote monitoring system to monitor the vehicle operating state. The emergence of M2M technology enriches the network society with new content. In the network society, besides the original management personnel, computers and IT devices, billions of devices of other industries are going to join as the members, for instance, the above mentioned electric equipment, petroleum equipment, car, etc.

M2M management platform, as a core module of receiving and processing information, receives all kinds of information uploaded from a machine terminal and performs subsequent analysis and process, and meanwhile transmits all kinds of information to the machine terminal to control the machine terminal. For example, the M2M management platform in an electric system receives the operating parameters of an electric distribution network uploaded from electric equipment and performs subsequent analysis and process on the operating parameters of the electric distribution network; and the M2M management platform can transmit various control instructions to the electric equipment to control the electric equipment.

During the processing on machine terminals, the existing M2M management platform views the machine terminals as independent devices which are not related. In this way, each service is processed separately. For example, there are two machine terminals with different functions in a region, wherein Machine Terminal A monitors a parameter in this region while Machine Terminal B monitors another parameter in this region. In this way, when the M2M management platform performs the monitoring of this region, the M2M management platform must perform the service processing twice before realizing the monitoring of this region. That is, the M2M management platform first exchanges information with Machine Terminal A and then exchanges information with Machine Terminal B. In this way, when the number of the machine terminals monitored by the M2M management platform becomes greater, the complexity of the service becomes higher and the monitoring process of the M2M management platform becomes more complex too.

In addition, based on the development of hardware technology, a new machine terminal can be integrated with more functions compared to an old machine terminal. However, if a new machine terminal is adopted to replace an old machine terminal each time, it would certainly cause a great deal of unnecessary waste of resource and cost.

SUMMARY OF THE INVENTION

Certain embodiments of this disclosure provide a device, a method and a system for processing M2M service information, so as to simplify processing of the M2M service and to improve processing efficiency of the M2M service.

Certain embodiments of this disclosure provide a device for processing M2M downlink service information, comprising: a receiving unit and a processing unit, wherein the receiving unit is configured to receive the M2M downlink service information transmitted to a first virtual terminal, in which the first virtual terminal has at least one function of at least two machine terminals; and the processing unit is configured, according to a corresponding relationship between a machine terminal and a function in the first virtual terminal, to determine the machine terminal corresponding to each function contained in the M2M downlink service information and to split the M2M downlink service information into the service information of individual machine terminals to send to the corresponding machine terminal.

Certain embodiments of this disclosure provide a device for processing M2M uplink service information, comprising: a receiving unit, a determination unit and a processing unit, wherein the receiving unit is configured to receive the M2M uplink service information reported by a machine terminal;

the determination unit is configured, according to a corresponding relationship between a virtual terminal and a machine terminal, to determine a second virtual terminal corresponding to the machine terminal reporting the M2M uplink service information, in which the second virtual terminal has at least one function of at least two machine terminals; and the processing unit is configured, when the M2M uplink service information is service information not reported at regular time and when determining that the M2M uplink service information corresponding to the second virtual terminal is complete according to the required function of the second virtual terminal, to send the M2M uplink service information corresponding to the second virtual terminal.

Certain embodiments of this disclosure provide a system for processing M2M service information, comprising:

a virtual terminal configuration module configured, according to the obtained information of a machine terminal, to configure a first corresponding relationship between a virtual terminal and the machine terminal and a second corresponding relationship between the machine terminal and a function in each virtual terminal, and to send the first corresponding relationship and the second corresponding relationship to a virtual terminal control module, wherein the virtual terminal has at least one function of at least two machine terminals; and a virtual terminal control module configured to save the first corresponding relationship and the second corresponding relationship, and to process the received M2M service information according to the saved first corresponding relationship and second corresponding relationship.

Certain embodiments of this disclosure provide a method for processing M2M downlink service information, comprising the steps of:

receiving the M2M downlink service information transmitted to a first virtual terminal, wherein the first virtual terminal has at least one function of at least two machine terminals; and determining the machine terminal corresponding to each function contained in the M2M downlink service information according to a corresponding relationship between the machine terminal and the function in the first virtual terminal, and splitting the M2M downlink service information into the service information of individual machine terminals to send to the corresponding machine terminal.

Certain embodiments of this disclosure provide a method for processing M2M uplink service information, comprising the steps of:

receiving the M2M uplink service information reported by a machine terminal;

determining a second virtual terminal corresponding to the machine terminal reporting the M2M uplink service information according to a corresponding relationship between a virtual terminal and a machine terminal, wherein the second virtual terminal has at least one function of at least two machine terminals; and sending the M2M uplink service information corresponding to the second virtual terminal, when the M2M uplink service information is service information not reported at regular time and when determining that the M2M uplink service information corresponding to the second virtual terminal is complete according to the required function of the second virtual terminal.

In certain embodiments of this disclosure, after configuring a virtual terminal according to preset rules, the M2M management platform performs integration, including splitting or combining, on the machine terminals managed by the M2M management platform. In this way, a virtual terminal with multiple functions can be assembled by configuring the virtual terminal. Thus, it is not necessary to replace an old terminal with a new terminal. When processing the M2M service, multiple services can be combined into one service. Through the management of the virtual terminal, the management of the machine terminal is implemented, the processing of the service is simplified, and the processing efficiency of the service is improved.

DETAILED DESCRIPTION OF THE EMBODIMENTS

Figure 1:
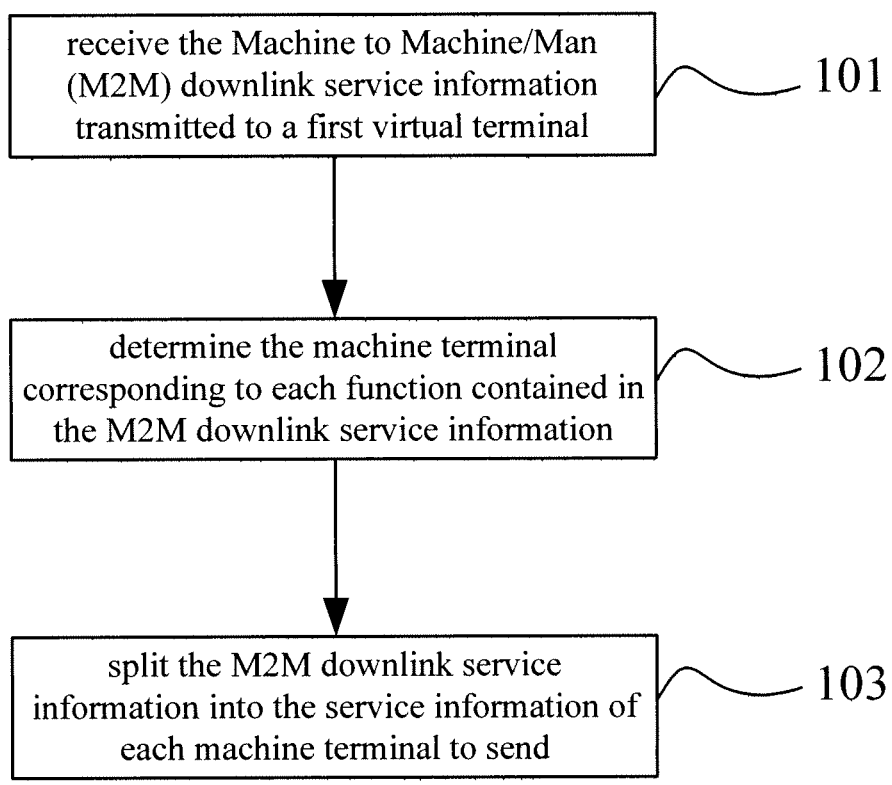
FIG. 1 shows a flowchart of processing M2M downlink service information according to certain embodiment of this disclosure.

In certain embodiment of this disclosure, a virtual terminal is configured according to the obtained information of each machine terminal, wherein the virtual terminal has at least one function of at least one machine terminal. In this way, the M2M management platform implements the management on the machine terminal through the management on the virtual terminal. That is to say, in certain embodiment of this disclosure, the M2M management platform does not implement the management on the machine terminal according to the fixed information of the machine terminal, but split or combine the information of some machine terminals to form the information of a corresponding virtual terminal. Then, when processing the M2M service, the M2M management platform can process the M2M service including multiple specific functions at one time. Therefore, through the management of the virtual terminal, the management on the machine terminal is realized, the processing of the service is simplified and the processing efficiency of the service is improved.

In this way, in certain embodiment of this disclosure, a machine terminal can form a virtual terminal, or one type of machine terminals can form one type of virtual terminals, or a machine terminal is divided into multiple virtual terminals, or one type of machine terminals are divided into multiple types of virtual terminals, or multiple machine terminals constitute a virtual terminal, or a machine terminal and a virtual terminal constitute a new virtual terminal.

In certain embodiment of this disclosure, the information of the virtual terminal can be configured manually or automatically. If the information of the virtual terminal is configured manually, specific machine terminals are selected to be combined or be split according to the information of each machine terminal, so as to form a corresponding virtual terminal and generate the information of the virtual terminal. If the information of the virtual terminal is configured automatically, the M2M management platform first obtains one piece or more pieces of information of the machine terminal, then configures the corresponding relationship between the machine terminal and the virtual terminal based on preset rules according to the obtained information, and generates the information of the virtual terminal, wherein the virtual terminal has at least one function of at least one machine terminal.

The device described in certain embodiment of this disclosure for configuring a virtual terminal in M2M comprises:

an acquisition unit, configured to acquire information of a machine terminal, wherein the information comprises at least one function; and a configuration unit, adapted to configure, according to the acquired information, a first corresponding relationship between a virtual terminal and a machine terminal based on preset rules, and a second corresponding relationship between a machine terminal and a function in each virtual terminal.

Here, the information of the machine terminal includes: type, function, location or quantity. In this way, a virtual terminal can be configured according to preset rules. For instance: the same type of machine terminals are enabled to correspond to a virtual terminal; or according to the location information of each machine terminal, all machine terminals located within a preset distance are enabled to correspond to a virtual terminal; or if a machine terminal has multiple functions, each function of the machine terminal is enabled to correspond to a virtual terminal. Of course, certain embodiment of this disclosure also can configure a virtual terminal according to other rules, the description of which is omitted here.

According to the configuration process above, the first corresponding relationship configured between the virtual terminal and the machine terminal, and the second corresponding relationship between the machine terminal and the function in each virtual terminal are as shown in Table 1.

TABLE 1

| Virtual Terminal | Machine Terminal | Function |
|---|---|---|
| Virtual Terminal 1 | Machine Terminal 1 | Function A |
|  | Machine Terminal 2 | Function B |
| Virtual Terminal 2 | Machine Terminal 3 | Function C |
| Virtual Terminal 3 | Machine Terminal 4 | Function E |
| Virtual Terminal 4 | Machine Terminal 4 | Function F |
| - - - | - - - | - - - |

In certain embodiment of this disclosure, in order to simplify the processing of the M2M service and to improve the processing efficiency of the M2M service, generally multiple M2M services are combined into one M2M service to process. Therefore, in the embodiment below, a virtual terminal has at least one function of at least two machine terminals. That is, a virtual terminal corresponds to at least two machine terminals. For the virtual terminal only corresponding to one machine terminal, when processing the M2M service information, the virtual terminal can be viewed as a machine terminal, and the M2M service information is processed based on the conventional art.

FIG. 1 shows a flowchart of processing M2M downlink service information according to certain embodiment of this disclosure. As shown in FIG. 1, after a virtual terminal is configured, the processing of the M2M service comprises the following steps.

Step 101: receiving the M2M downlink service information transmitted to a first virtual terminal.

Since the virtual terminal has been configured, the first corresponding relationship between the virtual terminal and the machine terminal, and the second corresponding relationship between the machine terminal and the function in each virtual terminal are saved. In addition, the first virtual terminal has at least one function of at least two machine terminals. In this way, the M2M management platform implements the management on the machine terminal through the management on the virtual terminal. Therefore, the uplink service generates a piece of M2M downlink service information transmitted to the first virtual terminal.

Step 102: determining the machine terminal corresponding to each function contained in the M2M downlink service information.

Here, the machine terminal corresponding to each function contained in the M2M downlink service information is determined according to the saved corresponding relationship between the machine terminal and the function in the first virtual terminal.

Taking Table 1 as the example: when the M2M downlink service information is an instruction transmitted to Virtual Terminal 1 to obtain the data of Function A and Function B, then the M2M downlink service information includes Function A and Function B; and then according to the saved corresponding relationship between the machine terminal and the function in the Virtual Terminal 1, it is determined that Function A corresponds to the Machine Terminal 1 and Function B corresponds to the Machine Terminal 2.

Step 103: splitting, according to the determined machine terminal, the M2M downlink service information into the service information of individual machine terminals to send to the corresponding machine terminal. Ending the processing flow.

As in the example above, the M2M downlink service information is split into an instruction transmitted to the Machine Terminal 1 to obtain the data of Function A and an instruction transmitted to the Machine Terminal 2 to obtain the data of Function B, and they are sent out.

During the processing of the M2M downlink service information, the function in the first virtual terminal corresponding to and consistent with the function contained in the M2M downlink service information can be identified. For example, when the M2M downlink service information is an instruction transmitted to the Virtual Terminal 1 to obtain the data of Function A and Function B, then Function A and Function B in the Table 1 are identified; and when the M2M downlink service information is an instruction transmitted to the Virtual Terminal 1 to obtain the data of Function A, then only Function A in the Table 1 is identified.

Figure 2:
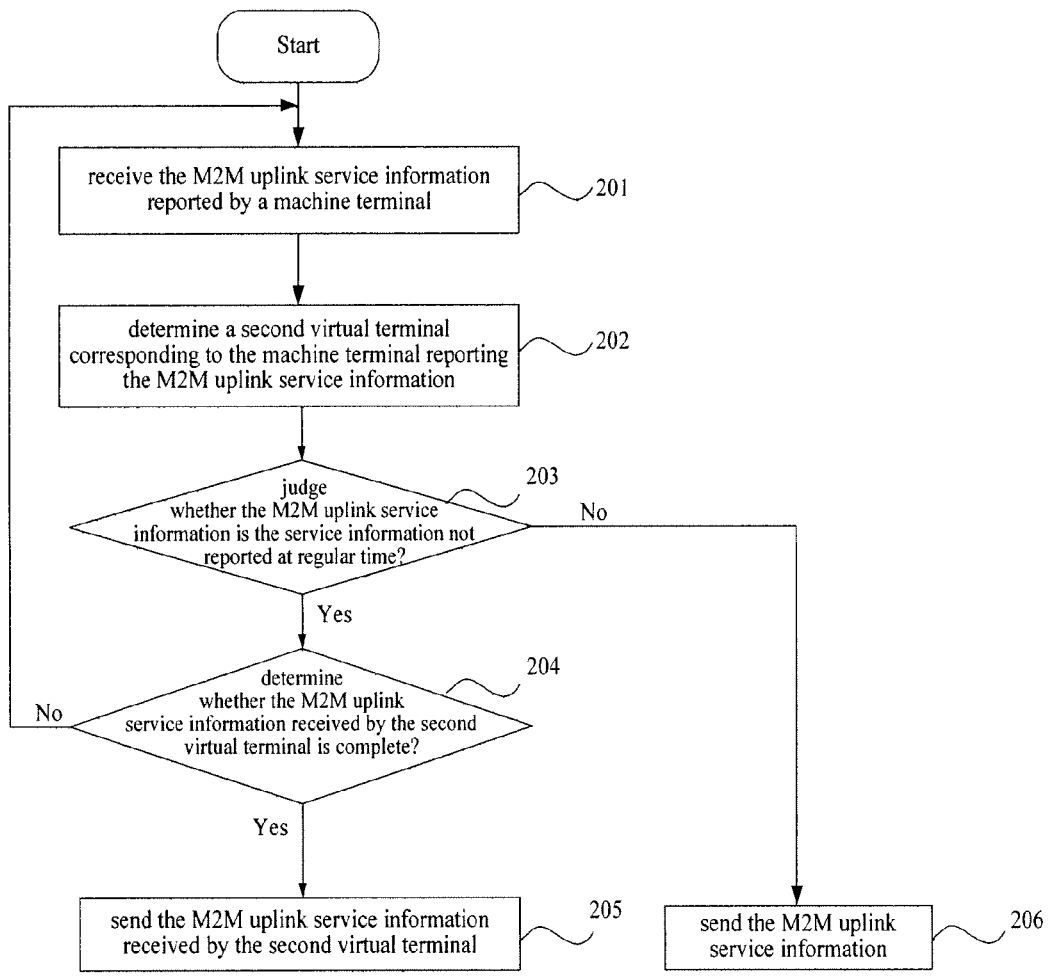
FIG. 2 shows a flowchart of processing M2M uplink service information according to certain embodiment of this disclosure.

The above only illustrates the processing of the M2M downlink service information. The processing of the M2M service also comprises the processing of the M2M uplink service information. FIG. 2 shows a flowchart of processing M2M uplink service information according to certain embodiment of this disclosure. As shown in FIG. 2, the processing flow of the M2M uplink service information may comprise the following steps.

Step 201: receiving the M2M uplink service information reported by a machine terminal.

The M2M uplink service information can be divided into the service information reported at regular time by the machine terminal, the service information reported by the machine terminal actively, and the service information returned for the M2M downlink service information. That is, the M2M uplink service information is divided into the service information reported at regular time and the service information not reported at regular time, wherein the service information not reported at regular time is further divided into the active M2M uplink service information and the passive M2M uplink service information.

Step 202: determining a second virtual terminal corresponding to the machine terminal reporting the M2M uplink service information, wherein the second virtual terminal has at least one function of at least two machine terminals.

When the machine terminal sending the M2M uplink service information is determined, then according to the saved first corresponding relationship between the virtual terminal and the machine terminal, the second virtual terminal corresponding to the machine terminal is determined.

As shown in Table 1, when the machine terminal sending the M2M uplink service information is the Machine Terminal 1, the corresponding second virtual terminal is the Virtual Terminal 1; and when the machine terminal sending the M2M uplink service information is the Machine Terminal 2, the corresponding second virtual terminal is the Virtual Terminal 1.

Step 203: determining the type of the M2M uplink service information. That is, it is judged whether the M2M uplink service information is the service information not reported at regular time, and if yes, Step 204 is executed, otherwise, Step 206 is executed.

Step 204: determining whether the M2M uplink service information corresponding to the second virtual terminal is complete according to the required function of the second virtual terminal, and if yes, step 205 is executed, otherwise, the flow returns to Step 201.

Here, at first, the required function of the second virtual terminal is determined and the M2M uplink service information is stored in a cache region of the second virtual terminal. Then the function contained in the M2M uplink service information stored in the cache region is matched with the determined required function. When the function is consistent with the required function, it is indicated that the information stored in the cache region is complete. That is, the M2M uplink service information corresponding to the second virtual terminal is complete. Then the subsequent service processing can be conducted. If the function is inconsistent with the required function, the service is not processed for the time being, and after the information in the cache region is complete, the services are processed together. Then the flow returns to Step 201 immediately.

As shown in Table 1, the M2M uplink service information is the data of Function A transmitted by the Machine Terminal 1, while the required function of the Virtual Terminal 1 corresponding to the Machine Terminal 1 is Function A. Then Step 205 is executed. If the required function of the Virtual Terminal 1 is Function A and Function B, then the information in the cache region is incomplete, and then the flow returns to Step 201.

Here, the M2M uplink service information might be the active M2M uplink service information and the passive M2M uplink service information. If the M2M uplink service information is the passive M2M uplink service information returned for the M2M downlink service information, when the M2M downlink service information is processed, some or all functions in the virtual terminal are identified. That is, some functions carry identifiers.

Therefore, the process of determining the required function of the second virtual terminal comprises the following steps.

First, judging whether the second virtual terminal has a function carrying an identifier, and if yes, determining that the function carrying an identifier is the required function of the second virtual terminal, otherwise, determining that all functions of the second virtual terminal are the required function of the second virtual terminal.

As shown in Table 1, if Function A carries an identifier in the Virtual Terminal 1, it is indicated that the required function of the second virtual terminal is Function A. If no function carries an identifier in the Virtual Terminal 1, it is indicated that the required function of the second virtual terminal is Function A and Function B.

Step 205: sending the M2M uplink service information corresponding to the second virtual terminal. The processing of the service is ended.

Since the information in the cache region is complete, it is continued to report the M2M uplink service information in the cache region to the upper layer service to perform the subsequent service processing.

Of course, in certain embodiment of this disclosure, after sending the M2M uplink service information in the cache region, the M2M uplink service information in the cache region can be deleted so as to process a next service. In addition, the identifier of the function carrying an identifier in the second virtual terminal are cancelled.

Step 206: sending the M2M uplink service information. The processing of the service is ended.

Since the M2M uplink service information is the service information reported at regular time, it is continued to report the M2M uplink service information to the upper layer service to perform the subsequent service processing.

Certain embodiment of this disclosure is further described in detail hereinafter in conjunction with the drawings.

Embodiment

In the embodiment, M2M is adopted to monitor the hydrologic regime of a lake. Some machine terminals A are put in the lake, including: A1, A2, - - -, An, and these machine terminals can feed back the information such as location, temperature, etc. to the M2M platform at regular time. Some machine terminals B are also put in this lake, including: B1, B2, - - -, Bm, and these machine terminals can feed back the information such as location, flow velocity, etc. to the M2M platform.

In this way, after these machine terminals are put in the lake, the M2M can obtain the information of each machine terminal, for instance, the information such as the location, function and type of A1, the location, function and type of A2, - - -, the location, function and type of B1, - - -, and the location, function and type of Bm. In the embodiment, the machine terminals within 10 centimeters are combined into a virtual terminal. Therefore, it is possible that A1 and B1 are combined into a Virtual Terminal C1, A2 and B2 are combined into a Virtual Terminal C2, - - -, and Am and Bm are combined into a Virtual Terminal Cm. In this way, the information of C1 is configured according to the information of A1 and B1, the information of the C2 is configured according to the information of A2 and B2, - - -, and the information of the Cm is configured according to the information of Am and Bm.

The first corresponding relationship configured between the virtual terminal and the machine terminal, and the second corresponding relationship between the machine terminal and the function in each virtual terminal are as shown in Table 2.

TABLE 2

| Virtual Terminal | Machine Terminal | Function |
| --- | --- | --- |
| C1 | A1 | Temperature |
|  | B1 | Flow velocity |
| C2 | A2 | Temperature |
|  | B2 | Flow velocity |
| C3 | A3 | Temperature |
|  | B3 | Flow velocity |
| - - - | - - - | - - - |

Figure 3:
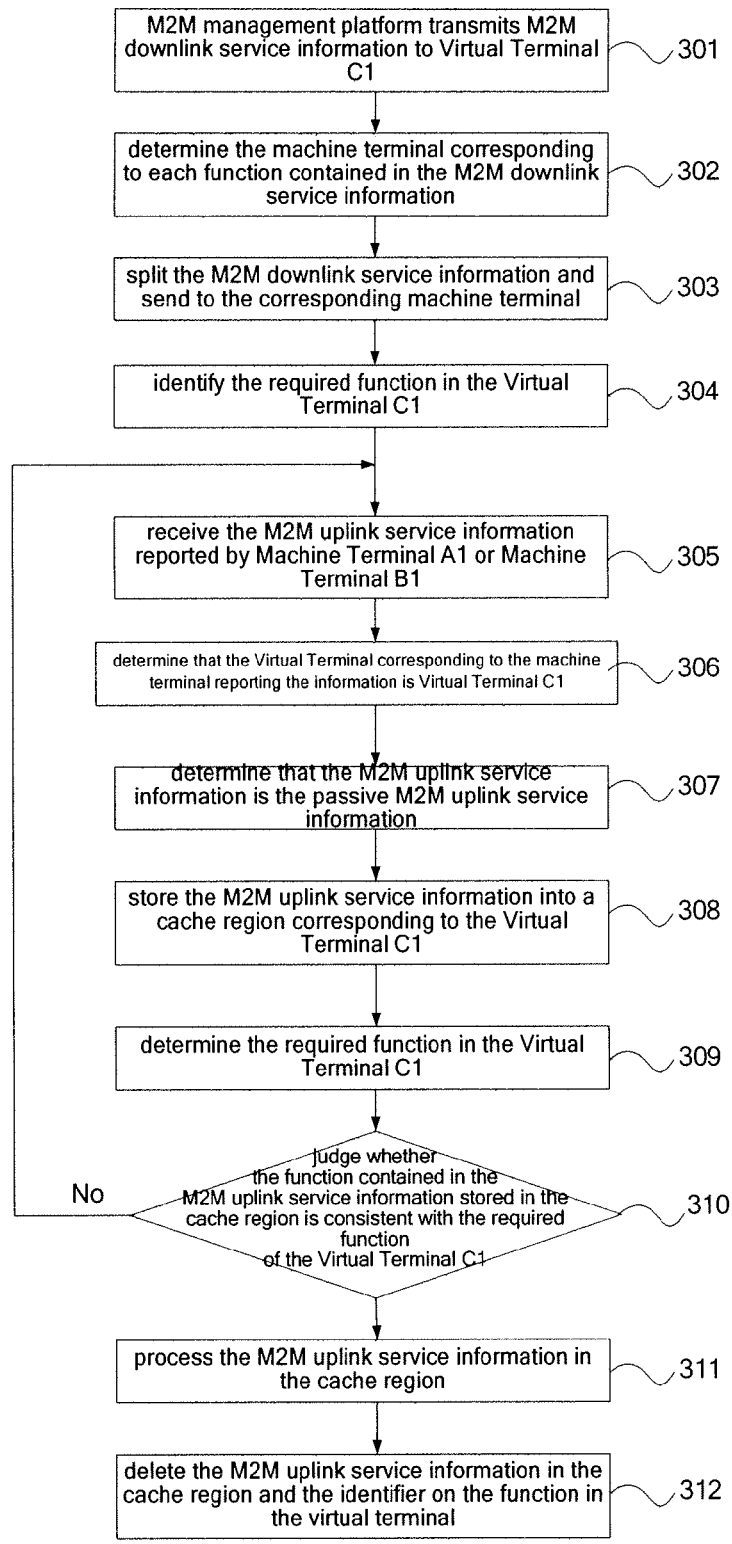
FIG. 3 shows a flowchart of processing M2M service information according to certain embodiment of this disclosure.

As shown in Table 2, virtual terminals are configured and each has two functions of two machine terminals. FIG. 3 shows a flowchart of processing M2M service information according to certain embodiment of this disclosure. As shown in FIG. 3, the M2M management platform processing the service comprises the following steps.

Step 301: the M2M management platform transmits M2M downlink service information to Virtual Terminal C1.

Step 302: the machine terminal corresponding to each function contained in the M2M downlink service information is determined.

When the transmitted M2M downlink service information is used to obtain the data of temperature and flow velocity, according to Table 2, it is determined that the temperature corresponds to Machine Terminal A1 and the flow velocity corresponds to Machine Terminal B1.

When the transmitted M2M downlink service information is used to obtain the data of temperature only, according to Table 2, it is determined that the temperature corresponds to Machine Terminal A1.

Step 303: according to the determined machine terminal, the M2M downlink service information is split to send to the corresponding machine terminal.

Here, when the transmitted M2M downlink service information is used to obtain the data of temperature and flow velocity, the M2M downlink service information is split into an instruction transmitted to Machine Terminal A1 to obtain the data of temperature and an instruction transmitted to Machine Terminal B1 to obtain the data of flow velocity.

Step 304: the required function in Virtual Terminal C1 is identified.

If the M2M downlink service information includes the function of temperature and the function of flow velocity, both the temperature and the flow velocity in Virtual Terminal C1 are identified. If the M2M downlink service information includes the function of temperature only, only the temperature in Virtual Terminal C1 is identified.

In this way, the M2M management platform processes the M2M downlink service information and continues the processing after receiving the M2M uplink service information.

Step 305: the M2M uplink service information reported by Machine Terminal A1 or Machine Terminal B1 is received.

After receiving the M2M downlink service information, the machine terminal in the lake performs feedback. Therefore, after A1 receives the corresponding service information, A1 feeds back the information such as location, temperature, etc. to the M2M management platform as the M2M uplink service information. Meanwhile, the M2M uplink service information further includes some information of A1 itself, such as, function, signal, etc. Similarly, B1 also feeds back the information such as location, flow velocity, etc. to the M2M management platform as the M2M uplink service information.

Step 306: it is determined that the Virtual Terminal corresponding to the machine terminal reporting the information is Virtual Terminal C1.

Here, if the M2M uplink service information reported by A1 is received, then according to Table 2, it is determined that the virtual terminal corresponding to A1 is C1. Similarly, if the M2M uplink service information reported by B1 is received, then according to Table 2, it is determined that the virtual terminal corresponding to B1 is C1.

Step 307: it is determined that the M2M uplink service information is the passive M2M uplink service information.

Step 308: the M2M uplink service information is store into a corresponding cache region of Virtual Terminal C1.

Step 309: the required function in Virtual Terminal C1 is determined.

Since the required function of Virtual Terminal C1 has been identified in Step 304, the function carrying an identifier in C1 is the required function. If both temperature and flow velocity are identified, both of them are the required function. If only temperature is identified, temperature is the required function.

Step 310: it is judged whether the function contained in the M2M uplink service information stored in the cache region is consistent with the required function of Virtual Terminal C1, and if yes, Step 311 is executed, otherwise, the flow returns to Step 305.

If the required function of C1 is temperature and the M2M uplink service information in the cache region just is the temperature data reported by Machine Terminal A, it is considered that the two are consistent. Then, Step 311 is executed. If the required function of C1 is temperature and flow velocity, and the M2M uplink service information in the cache region only has the temperature data reported by Machine Terminal A, it is considered that they two are inconsistent. Then the flow returns to Step 305.

Step 311: the M2M uplink service information in the cache region is processed.

Here, the information such as temperature and flow velocity within a certain region can be obtained, stored and analyzed, so as to better monitor the hydrologic regime of the lake.

Step 312: the M2M uplink service information in the cache region and the identifier on the function in the virtual terminal are deleted. The processing flow of this service is ended.

Figure 4:
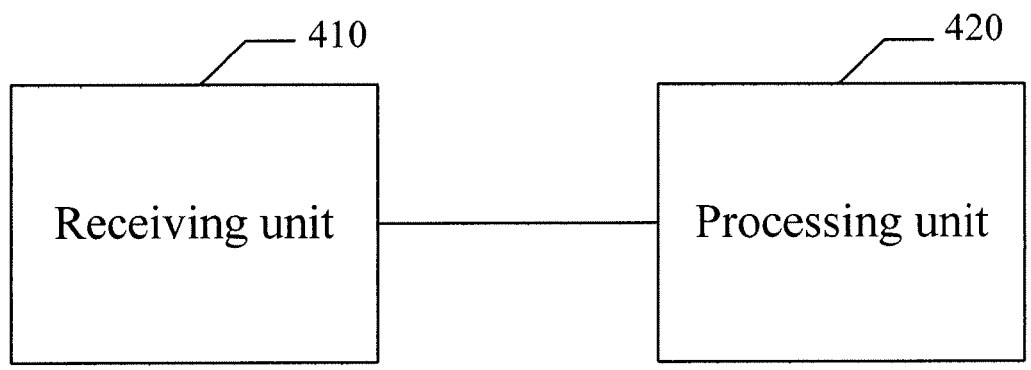
FIG. 4 shows a structure diagram of a device for processing M2M downlink service information according to certain embodiment of this disclosure.

According to the above method for processing the M2M downlink service, a device for processing the M2M downlink service can be constructed. FIG. 4 shows a structure diagram of a device for processing M2M downlink service information according to certain embodiments of this disclosure. As shown in FIG. 4, the device comprises: a receiving unit 410 and a processing unit 420, in which, the receiving unit 410 is configured to receive the M2M downlink service information transmitted to a first virtual terminal, wherein the first virtual terminal has at least one function of at least two machine terminals; and the processing unit 420 is configured to determine, according to a corresponding relationship between a machine terminal and a function in the first virtual terminal, the machine terminal corresponding to each function contained in the M2M downlink service information and to split the M2M downlink service information into the service information of individual machine terminals to send to the corresponding machine terminal.

The processing unit 420 is further configured to identify the function in the first virtual terminal corresponding to and consistent with the function contained in the M2M downlink service information.

Figure 5:
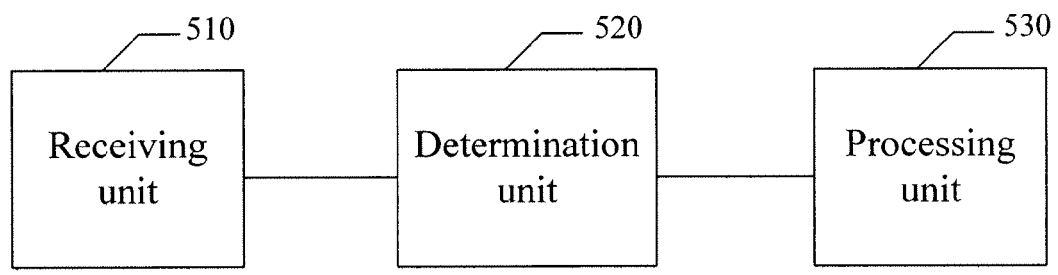
FIG. 5 shows a structure diagram of a device for processing M2M uplink service information according to certain embodiment of this disclosure.

According to the above method for processing the M2M uplink service, a device for processing the M2M uplink service can be constructed. FIG. 5 shows a structure diagram of a device for processing M2M uplink service information according to certain embodiment of this disclosure. As shown in FIG. 5, the device comprises: a receiving unit 510, a determination unit 520 and a processing unit 530.

The receiving unit 510 is configured to receive the M2M uplink service information reported by a machine terminal.

The determination unit 520 is configured to determine, according to a corresponding relationship between a virtual terminal and a machine terminal, a second virtual terminal corresponding to the machine terminal reporting the M2M uplink service information, wherein the second virtual terminal has at least one function of at least two machine terminals.

The processing unit 530 is configured to send, when the M2M uplink service information is the service information not reported at regular time and when determining that the M2M uplink service information corresponding to the second virtual terminal is complete according to the required function of the second virtual terminal, the M2M uplink service information corresponding to the second virtual terminal.

The processing unit 530 is further configured to determine the required function of the second virtual terminal, to store the M2M uplink service information into a cache region of the second virtual terminal, and to match the function contained in the M2M uplink service information stored in the cache region with the determined required function, and to determine, when the function is consistent with the required function, that the M2M uplink service information received by the second virtual terminal is complete.

The processing unit 530 is further configured to judge whether the second virtual terminal has a function carrying an identifier, and if yes, determine that the function carrying an identifier is the required function of the second virtual terminal, otherwise, determine that all functions of the second virtual terminal are the required function of the second virtual terminal.

Further, the processing unit 530 is further configured to send the M2M uplink service information, when the M2M uplink service information is the service information reported at regular time.

Figure 6:
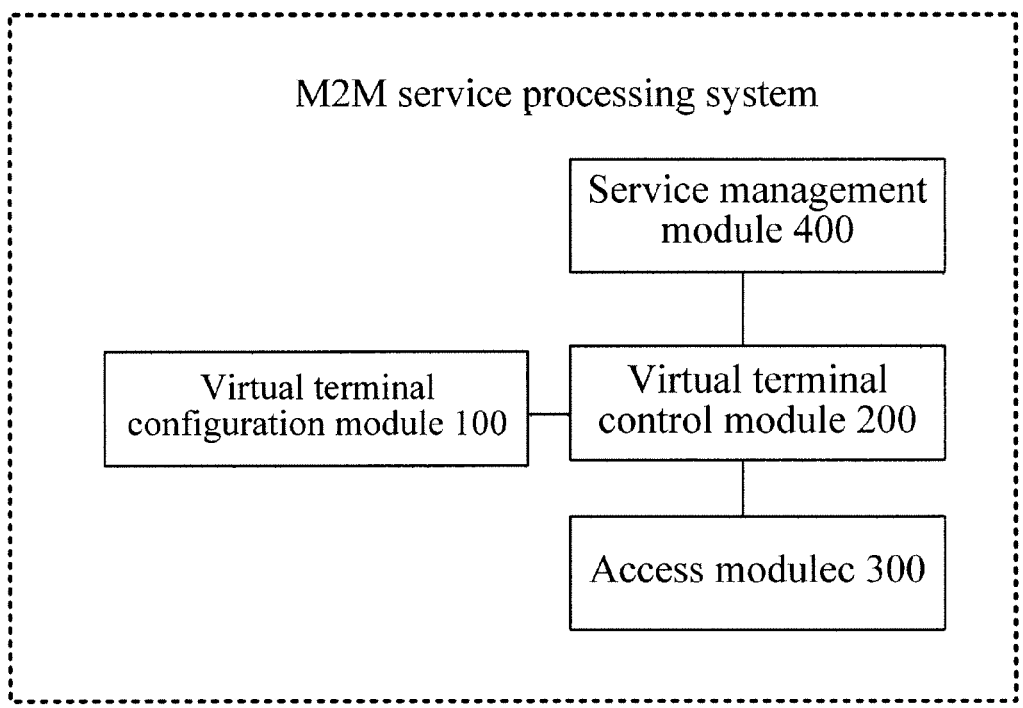
FIG. 6 shows a structure diagram of a system for processing M2M service information according to certain embodiment of this disclosure.

In certain embodiment of this disclosure, the device for processing the M2M service can be applied in the M2M management platform. In this way, an M2M management system can be constructed. FIG. 6 shows a structure diagram of a system for processing M2M service information according to certain embodiment of this disclosure. As shown in FIG. 6, the M2M management platform comprises: a virtual terminal configuration module 100 and a virtual terminal control module 200.

In this case, the virtual terminal configuration module 100 is configured to configure, according to the obtained information of a machine terminal, a first corresponding relationship between a virtual terminal and the machine terminal and a second corresponding relationship between the machine terminal and a function in each virtual terminal, and to send the first corresponding relationship and the second corresponding relationship to the virtual terminal control module, wherein the virtual terminal has at least one function of at least two machine terminals.

The virtual terminal control module 200 is configured to save the first corresponding relationship and the second corresponding relationship, and to process the received M2M service information according to the saved first corresponding relationship and second corresponding relationship.

In certain embodiment of this disclosure, the system further comprises: an access module 300 and a service processing module 400, in which, the virtual terminal configuration module 100 is connected with the virtual terminal control module 200, and the virtual terminal control module 200 is not only connected with the virtual terminal configuration module 100, but also connected with the access module 300 and the service processing module 400.

In this way, the service management module 400 is configured to generate the M2M downlink service information to be transmitted to the first virtual terminal and to send the M2M downlink service information to the virtual terminal control module.

The virtual terminal control module 200 is further configured to determine, according to the second corresponding relationship between the machine terminal and the function in the first virtual terminal, the machine terminal corresponding to each function contained in the M2M downlink service information and to split the M2M downlink service information into the service information of individual machine terminals to send to the access module.

The access module 300 is configured to send the received service information to the corresponding machine terminal.

In addition, the virtual terminal control module 200 is further configured to identify the function in the first virtual terminal corresponding to and consistent with the function contained in the M2M downlink service information.

In certain embodiment of this disclosure, the access module 300 is further configured to send to the virtual terminal control module the received M2M uplink service information reported by the machine terminal.

The virtual terminal control module 200 is further configured to determine, according to the first corresponding relationship between the virtual terminal and the machine terminal, the second virtual terminal corresponding to the machine terminal reporting the M2M uplink service information, and to send, when the M2M uplink service information is the service information not reported at regular time and when determining that the M2M uplink service information corresponding to the second virtual terminal is complete according to the required function of the second virtual terminal, the M2M uplink service information corresponding to the second virtual terminal to the service management module. The service management module 300 is further configured to process the received M2M uplink service information.

The virtual terminal control module 200 is further configured to determine the required function of the second virtual terminal, to store the received M2M uplink service information into a cache region of the second virtual terminal, and to match the function contained in the M2M uplink service information stored in the cache region with the determined required function, and to determine, when the function is consistent with the required function, that the M2M uplink service information corresponding to the second virtual terminal is complete. And the virtual terminal control module 200 is further configured to judge whether the second virtual terminal has a function carrying an identifier, and if yes, determine that the function carrying an identifier is the required function of the second virtual terminal, otherwise, determine that all functions of the second virtual terminal are the required function of the second virtual terminal.

Besides, the virtual terminal control module 200 is further configured to send the M2M uplink service information to the service management module when the M2M uplink service information is the service information reported at regular time.

In certain embodiment of this disclosure, after configuring a virtual terminal according to preset rules, the M2M management platform performs integration, including splitting or combining, on the machine terminals managed by the M2M management platform. In this way, by configuring the virtual terminal information, a virtual terminal with multiple functions can be assembled. Thus it is not necessary to replace an old terminal with a new terminal. When processing the M2M service, multiple services can be combined into one service. Through the management of the virtual terminal, the management of the machine terminal is implemented, the processing of the service is simplified and the processing efficiency of the service is improved.

Obviously, those skilled in the art can make various changes and modifications to the disclosure without departing from the spirit and the scope of the disclosure. In this way, if the changes and modifications of the disclosure belong to the scope of the claims of the disclosure and the equivalent technology, the disclosure is intended to include these changes and the modifications.

What is claimed is:

1. A device for processing Machine to Machine/Man (M2M) downlink or uplink service information, wherein
for processing downlink service information, the device comprises
a first receiving unit and a first processing unit, wherein
the first receiving unit is configured to receive the M2M downlink service information transmitted to a first virtual terminal, in which the first virtual terminal has at least one function of at least two machine terminals; and
the first processing unit is configured to determine, according to a corresponding relationship between the machine terminal and the function in the first virtual terminal, the machine terminal corresponding to each function contained in the M2M downlink service information and to split the M2M downlink service information into service information of individual machine terminals to send to the corresponding machine terminal;

or, for processing uplink service information, the device comprises a second receiving unit, a determination unit and a second processing unit, wherein the second receiving unit is configured to receive the M2M uplink service information reported by a machine terminal;

the determination unit is configured to determine, according to a corresponding relationship between a virtual terminal and a machine terminal, a second virtual terminal corresponding to the machine terminal reporting the M2M uplink service information, in which the second virtual terminal has at least one function of at least two machine terminals; and the second processing unit is configured to send, when the M2M uplink service information is service information not reported at regular time and when it is determined that the M2M uplink service information corresponding to the second virtual terminal is complete according to a required function of the second virtual terminal, the M2M uplink service information corresponding to the second virtual terminal.

2. The device according to claim 1, wherein the first processing unit is further configured to identify the function in the first virtual terminal corresponding to and consistent with the function contained in the M2M downlink service information.

3. The device according to claim 1, wherein the second processing unit is further configured to determine the required function of the second virtual terminal, to store the received M2M uplink service information into a cache region of the second virtual terminal, to match the function contained in the M2M uplink service information stored in the cache region with the determined required function, and to determine when the function is consistent with the required function, that the M2M uplink service information corresponding to the second virtual terminal is complete.

4. The device according to claim 3, wherein the second processing unit is further configured to judge whether the second virtual terminal has a function carrying an identifier, and to determine, if the second virtual terminal has a function carrying an identifier, that the function carrying the identifier is a required function of the second virtual terminal, and to determine, if the second virtual terminal has no function carrying an identifier, that all functions of the second terminal are required functions of the second virtual terminal.

5. The device according to claim 1, wherein the second processing unit is further configured to send, when the M2M uplink service information is service information reported at regular time, the M2M uplink service information.

6. A system for processing M2M service information, comprising: a virtual terminal configuration module and a virtual terminal control module, wherein the virtual terminal configuration module is adapted to configure, according to obtained information of a machine terminal, a first corresponding relationship between a virtual terminal and the machine terminal and a second corresponding relationship between the machine terminal and a function in each virtual terminal, and to send the first corresponding relationship and the second corresponding relationship to the virtual terminal control module, in which the virtual terminal has at least one function of at least two machine terminals; and the virtual terminal control module is adapted to save the first corresponding relationship and the second corresponding relationship, and to process the received M2M service information according to the saved first corresponding relationship and the saved second corresponding relationship.

7. The system according to claim 6, further comprising: a service management module and an access module, wherein the service management module is configured to generate M2M downlink service information to be transmitted to a first virtual terminal and to send the M2M downlink service information to the virtual terminal control module;

the virtual terminal control module is configured to determine, according to the second corresponding relationship between the machine terminal and the function in the first virtual terminal, the machine terminal corresponding to each function contained in the M2M downlink service information and to split the M2M downlink service information into service information of individual machine terminals to send to the access module; and the access module is configured to send the received service information to the corresponding machine terminal.

8. The system according to claim 7, wherein the virtual terminal control module is further configured to identify the function in the first virtual terminal corresponding to and consistent with the function contained in the M2M downlink service information.

9. The system according to claim 7, wherein the access module is further configured to send to the virtual terminal control module the received M2M uplink service information reported by the machine terminal;

the virtual terminal control module is further configured to determine, according to the first corresponding relationship between the virtual terminal and the machine terminal, a second virtual terminal corresponding to the machine terminal reporting the M2M uplink service information, and to send, when the M2M uplink service information is service information not reported at regular time and when it is determined that the M2M uplink service information corresponding to the second virtual terminal is complete according to a required function of the second virtual terminal, the M2M uplink service information corresponding to the second virtual terminal to the service management module; and the service management module is further configured to process the received M2M uplink service information.

10. The system according to claim 9, wherein the virtual terminal control module is further configured to determine the required function of the second virtual terminal, to store the received M2M uplink service information into a cache region of the second virtual terminal, to match the function contained in the M2M uplink service information stored in the cache region with the determined required function, and to determine, when the function is consistent with the required function, that the M2M uplink service information corresponding to the second virtual terminal is complete.

11. A method for processing M2M downlink or uplink service information, wherein for processing M2M downlink service information, the method comprises receiving the M2M downlink service information transmitted to a first virtual terminal, wherein the first virtual terminal has at least one function of at least two machine terminals; and determining a machine terminal corresponding to each function contained in the M2M downlink service information according to a corresponding relationship between the machine terminal and the function in the first virtual terminal, and splitting the M2M downlink service information into service information of individual machine terminals to send to the corresponding machine terminal;

or, for processing M2M uplink service information, the method comprises receiving the M2M uplink service information reported by a machine terminal;

determining a second virtual terminal corresponding to the machine terminal reporting the M2M uplink service information according to a corresponding relationship between a virtual terminal and the machine terminal, wherein the second virtual terminal has at least one function of at least two machine terminals; and sending the M2M uplink service information corresponding to the second virtual terminal, when the M2M uplink service information is service information not reported at regular time and when it is determined that the M2M uplink service information corresponding to the second virtual terminal is complete according to a required function of the second virtual terminal.

12. The method according to claim 11, wherein after determining the machine terminal corresponding to each function contained in the M2M downlink service information, the method further comprises:

identifying the function in the first virtual terminal corresponding to and consistent with the function contained in the M2M downlink service information.

13. The method according to claim 11, wherein the step of determining that the M2M uplink service information corresponding to the second virtual terminal is complete according to the required function of the second virtual terminal comprises:

determining the required function of the second virtual terminal and storing the received M2M uplink service information into a cache region of the second virtual terminal; and matching the function contained in the M2M uplink service information stored in the cache region with the determined required function, and when the function is consistent with the required function, determining that the M2M uplink service information corresponding to the second virtual terminal is complete.

14. The method according to claim 13, wherein the step of determining the required function of the second virtual terminal comprises: judging whether the second virtual terminal has a function carrying an identifier, and if the second virtual terminal has a function carrying an identifier, determining that the function carrying the identifier is a required function of the second virtual terminal, and if the second virtual terminal has no function carrying an identifier, determining that all functions of the second virtual terminal are required functions of the second virtual terminal.

* * * * *